United States Patent [19]
Veillard

[11] Patent Number: 4,713,689
[45] Date of Patent: Dec. 15, 1987

[54] FREQUENCY DEMODULATOR FOR TELEVISION RECEIVER WITH TIME MULTIPLEXING

[75] Inventor: Jacques Veillard, Saint Gregoire, France

[73] Assignees: Centre National d'Etudes des Telecommunications, Issy les Moulineaux; Etablissement Public de Diffusion dit "Telediffusion de France", Montrouge, both of France

[21] Appl. No.: 739,719

[22] Filed: May 31, 1985

[30] Foreign Application Priority Data

Jun. 4, 1984 [FR] France .................. 84 08727

[51] Int. Cl.⁴ .................. H04N 7/04; H04N 7/08
[52] U.S. Cl. .................. 358/146; 358/142; 358/141; 455/266; 455/340; 329/136; 329/139
[58] Field of Search ............ 455/266, 340; 358/141, 358/142, 143, 145, 146, 147; 329/139, 122, 136, 140

[56] References Cited

U.S. PATENT DOCUMENTS

| 3,984,624 | 10/1976 | Waggener | 358/142 |
| 4,045,740 | 8/1977 | Baker | 455/370 |
| 4,245,353 | 1/1981 | Bynum | 455/266 |
| 4,300,161 | 11/1981 | Haskell | 358/142 |
| 4,339,829 | 7/1982 | Dimon | 455/340 |
| 4,435,821 | 3/1984 | Ito et al. | 455/266 |
| 4,472,685 | 9/1984 | Dutasta | 455/340 |
| 4,531,148 | 7/1985 | Ohta et al. | 455/340 |
| 4,551,755 | 11/1985 | Matsuda et al. | 455/266 |
| 4,563,651 | 1/1986 | Ohta et al. | 329/139 |

FOREIGN PATENT DOCUMENTS 0075071 3/1983 European Pat. Off. ......... 455/266
2312881 12/1976 France .

Primary Examiner—James J. Groody
Assistant Examiner—Michael D. Parker
Attorney, Agent, or Firm—Larson & Taylor

[57] ABSTRACT

A receiver is provided for a television system which uses time division multiplexing (TDM) of analog image signals and of bursts of duobinary coded digital data signals. The digital data signals are transmitted during the line and frame blanking intervals and grouped together in packets, comprising the sound and synchronization signals, the spectral width required by the analog part being greater than that required by the digital part. The receiver comprises a common frequency demodulator for the analog and digital signals, adaptive as a function of the signal-to-noise ratio after demodulation as a width less than the width which is optimum for the analog part when the latter has a high signal-to-noise ratio. The demodulator has an input filter which is either analog or digital and may be adjusted in response to the error rate.

12 Claims, 18 Drawing Figures

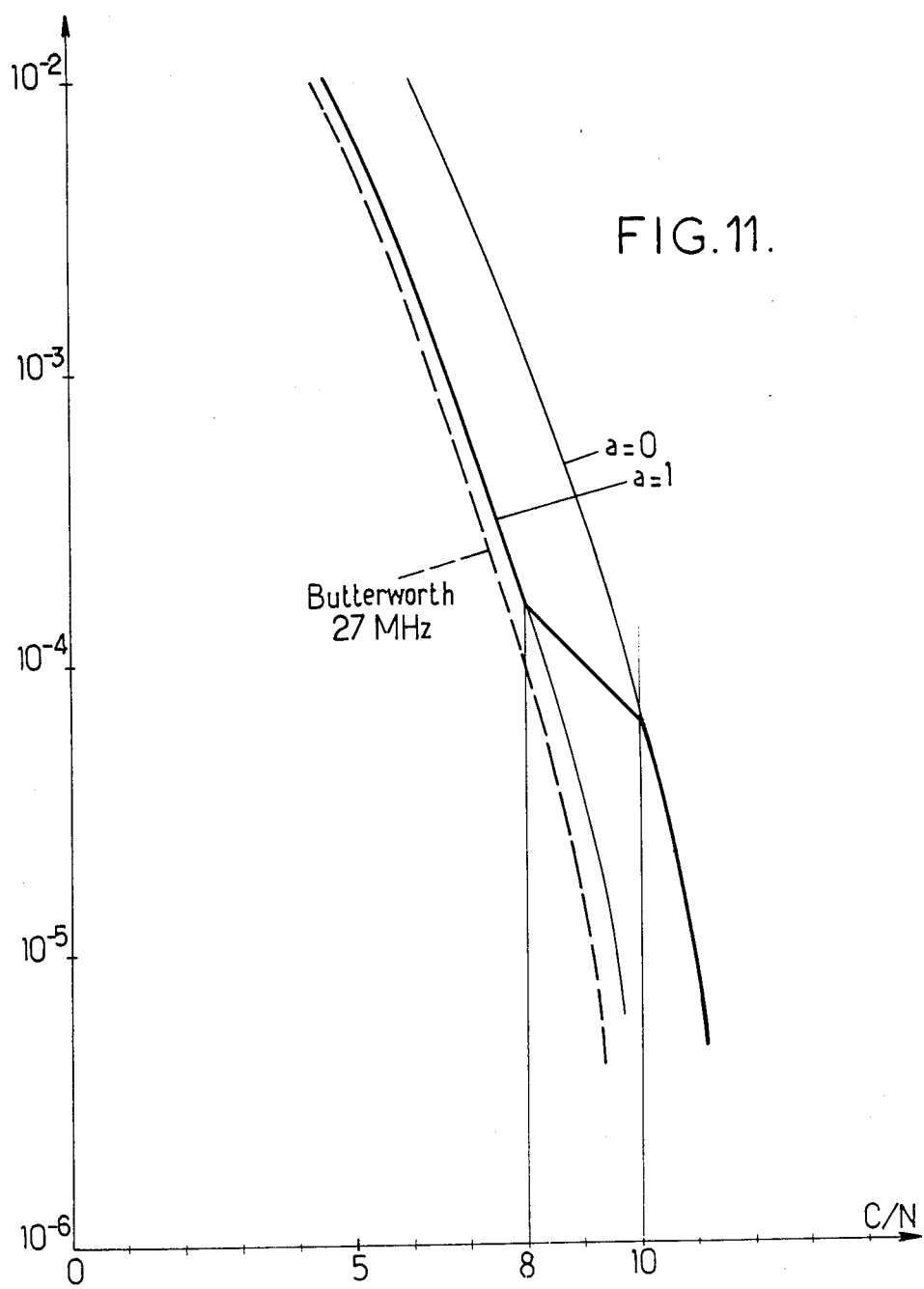

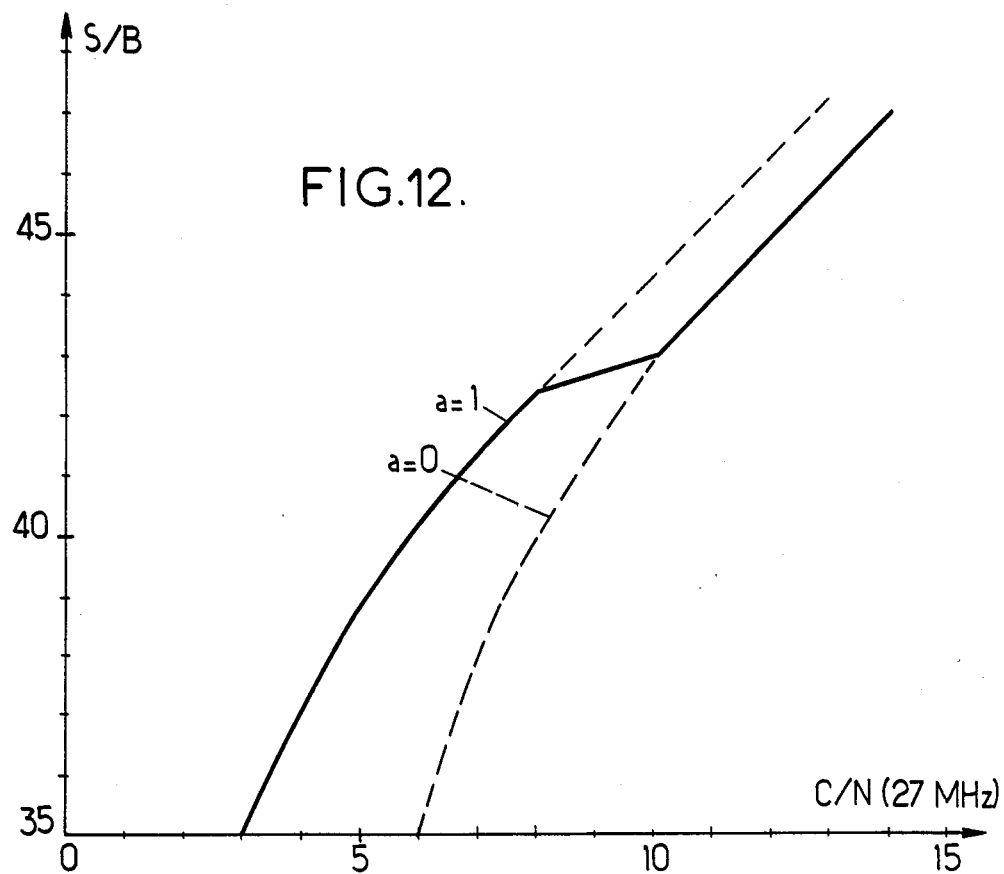
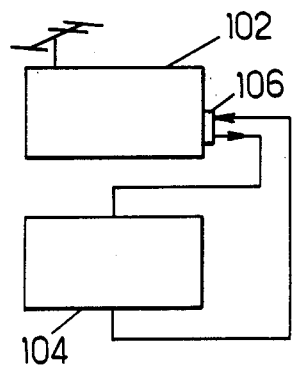

FREQUENCY DEMODULATOR FOR TELEVISION RECEIVER WITH TIME MULTIPLEXING

FIELD OF THE INVENTION

The invention relates to frequency demodulators suitable for use in TV receivers provided for receiving time multiplexed television signals, with analog picture signals and digital data signals coded in a form such that the spectral frequency band of the analog part is greater than that of the digital part. The invention is particularly suitable for use in systems where the broadcast signal consists of a time division multiplex (TDM) of an analog picture signal and a digital data signal transmitted during the line and frame blanking intervals and coded in accordance with a partial response code so as to reduce the required spectral width to a width less than that of the analog spectral width.

BACKGROUND OF THE INVENTION

R&D work conducted under the aegis of EBU (European Broadcasting Union) has led to defining a direct satellite television broadcasting system in the 12 GHz band, called "MAC-PACKET" a description of which can be found in the paper "The C-MAC/Packet system for direct satellite tv (EBU Review - Technical No. 220, August 1983). This system uses a RF time division multiplex signal in which the carrier is modulated by analog image signals (luminance and colour-difference) for a fraction of one scanning line and digitally for another fraction of the line duration by data (sound, synchronization, data channels if necessary). The signal may be such as shown in FIG. 1 in which the digital elements are transmitted in a multiplex by packets. In FIG. 1, the successive periods are assigned in the following way:

a: period occupied by a burst of digitally coded data, preceded by a line sync word, b: transition from end of data, including the leading edge of the separation (pedestal) signal added to the video to provide energy dispersal (this signal being possibly a triangular wave synchronous with the picture), c: clamping period (giving the zero level of the color difference and allowing the signal to be aligned at each scanning line), sc1: reserved for video encryption or scrambling, d: colour difference (chrominance) as analog samples with time compression in a 3/1 ratio, g: luminance, as analog samples with time compression in a 3/2 ratio, sc2: reserved for video encryption or scrambling, h: transition to data, including the trailing edge of the pedestal signal.

The C-MAC packet system now proposed for direct satellite television broadcast in the 12 GHz channel uses four state phase shift keying (MDP 2-4 or 2-4 FSK), at a clock frequency of 20.25 MHz, which leads to a frequency spectrum requirement incompatible with the use of the same coding as in land based networks. In addition, 2-4 FSK modulation (which uses digital coding with whole response) involves compliance with the first criterion of Nyquist, so a −6 dB passage point at the symbol half frequency has a high sensitivity to high frequency distorsions. Finally, the absence of base band representation further raises problems difficult to overcome when transmission takes place over land carriers (wired networks, radio links) using frequencies in the 7–8 MHz range.

SUMMARY OF THE INVENTION

It is an object of the invention to overcome the above-mentioned shortcomings of the C-MAC packet system. For that, the invention relies on the fact that substituting the 2-4 FSK modulation with base band coding with partial response, preferably duobinary coding, makes it possible:

to have identical base band representation for all transmission carriers (satellite, radio link, co-axial cable or optical fiber wired networks) whose spectrum requirement may, if required, be limited to a value of 5 to 8.5 MHz, to use the same frequency demodulator for the analog and digital signals (picture and data).

The last feature guarantees complete phase coincidence of the picture and data signals, since the time delays are automatically equal. This is an essential advantage since the clock and sync signals are extracted from the data.

According to an aspect of the invention, there is provided a common frequency demodulator for the analog and digital signals for a receiver adapted to a receiver TV broadcast whose analog part has a frequency bandwidth requirement greater than that of the digital part, said receiver comprising an input filter whose band width is adjusted or adjustable to a value intermediate between the optimum value for the analog signal when this latter has a high signal-to-noise ratio and the optimum value for the digital signal.

In an advantageous embodiment, the filter is self-adapting and its band width is controlled automatically to vary between a value close to the optimum value for the analog signal with high signal-to-noise ratio and a lower value which remains at least equal to the optimum value for the digital signal.

The filter may comprise a portion with a fixed pass band equal to the optimum value for the analog part cascaded with an adjustable portion comprising, in parallel relation, a direct channel and a channel consisting of a fixed delay and of an adjustable attenuator, the two channels being connected to two inputs of a summing circuit. Adjustment of the pass band is provided then by modifying the attenuation rate. The modification may be effected by means which measure the spectral density of the noise after demodulation in a narrow frequency band. Another solution consists in measuring the error rate on the bits of the digital signal and generating a voltage increasing with the error rate for controlling the attenuator.

Another approach consists in using an adaptive filter having three coefficients at least.

In another aspect of the invention, a receiver is provided for a television system with time division multiplexing of analog image signals and bursts of duobinary coded digital data signals, sent during the line and frame blanking intervals, grouped in packets, comprising the sound and sync signals, the spectral bandwidth required by the analog part being greater than that of the digital part. The receiver comprises a single frequency demodulator for the analog and digital signals, typically adaptive responsive to the signal-to-noise ratio after demodulation, but possibly fixed with a width less than the optimum width for the analog part with high signal-to-noise ratio. Thus degradation of the final image signal is considerably reduced in the presence of high level pulsive noise.

According to a further aspect of the invention, a surface acoustic wave frequency demodulator is provided for demodulating both the analog part and the digital part, with narrower spectral band than the analog part, of a frequency modulated RF signal with digital-analog time division multiplexing. The demodulator comprises, on the same substrate, a fixed filter having a band width corresponding to the spectral space required for the analog signal and driving four parallel channels. An input transducer is common to all channels and each channel has an output transducer. Two of the channels form a first pair in which the delays are $\tau O$ and $\tau O + \tau$ ($\tau O$ being an arbitrary value whereas $\tau$ is a value corresponding to filtering with a narrower band than that of the fixed filter) and drive a first summing circuit. The other two channels form a second pair in which the delays are $\tau O + \theta$ and $\tau O + \tau + \theta$ ($\theta$ fixing the frequency discrimination band width) and drive a second summing circuit. The two summing circuits drive, through respective limiters, the inputs of a multiplier whose output is subjected to low pass filtering. By placing, in the channels corresponding to the delays $\tau O + \tau$ and $\tau O + \tau + \theta$, attenuators having the same attenuation rate, controlled by the signal-to-noise ratio at the output of the low pass filter, the band width can be automatically adjusted at a value close to an optimum.

The algorithm for adjusting the band width may be selected depending upon the particular needs in each case. For example, an algorithm may be chosen for preventing the signal-to-noise ratio from dropping below a predetermined value and narrowing the band, up to the maximum authorized narrowing when this ratio tends to drop below this value (10 dB for example). Another solution consists in associating a value of the band width to each value of the signal-to-noise ratio after demodulation when the signal-to-noise ratio is below a predetermined value.

The frequency demodulator is followed by a low pass filter. Optimum performances are obtained for demodulation of the digital signal when the low pass filter is a cosine arch filter having (in the case of the duobinary modulation television signal mentioned above) a band width at −3 dB equal to 5 MHz and a transfer function as defined by:

$$H(v) = \cos(\pi v T/2) \text{ for } v < 1/T = 10 \text{ MHz}$$
$$= 0 \text{ for } v > 1/T.$$

For the analog signal however, optimum quality of the picture signal above the threshold is obtained with a low pass filter having a pass band at least equal to 7.5 MHz. In practice, this double condition will in general be fulfilled using a low pass filter having two parallel channels, one assigned to the digital signal and the other to the analog picture signal.

The invention will be better understood from the following description of particular embodiments given by way of examples only.

SHORT DESCRIPTION OF THE DRAWINGS

Figure 5:
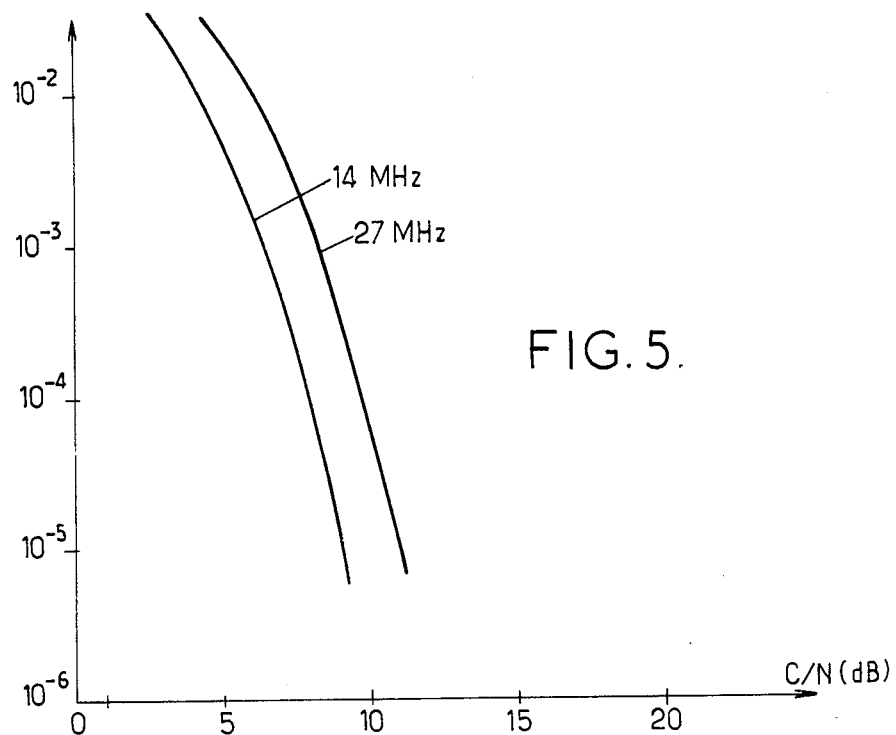
Figure 6:
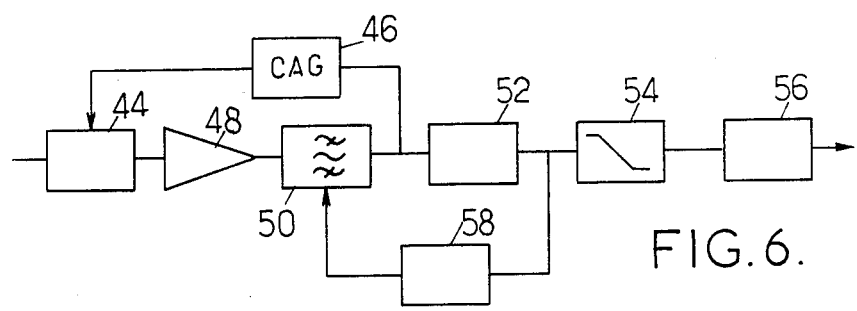
Figure 7:
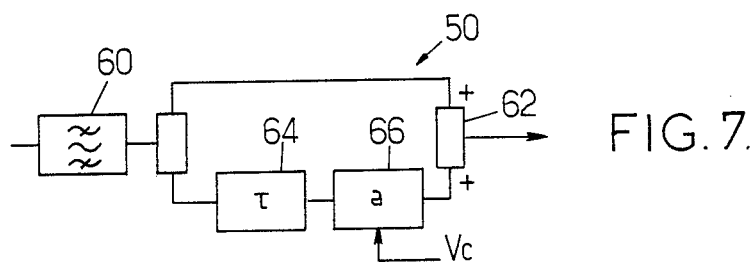
Figure 8:
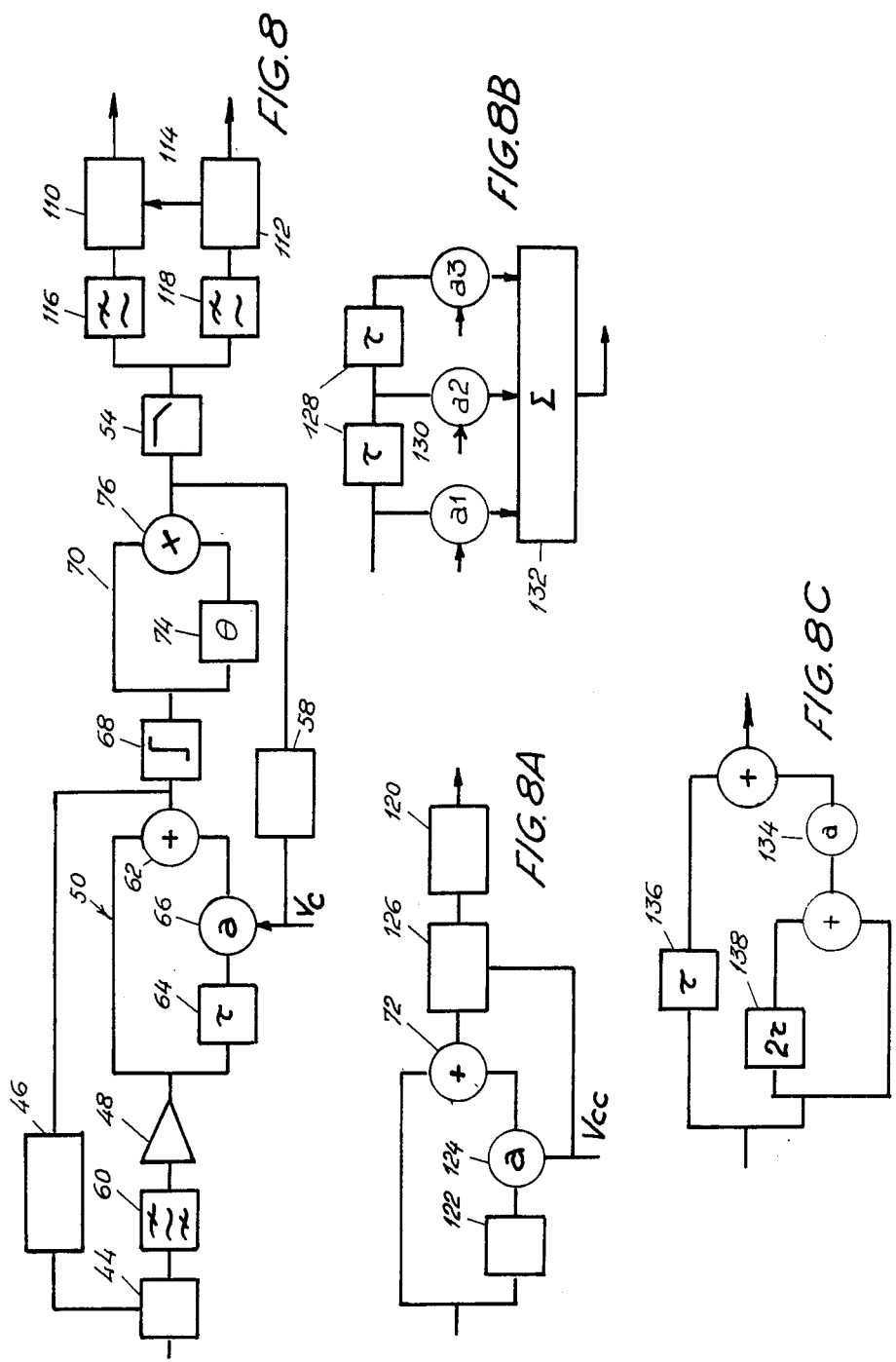
Figure 9:
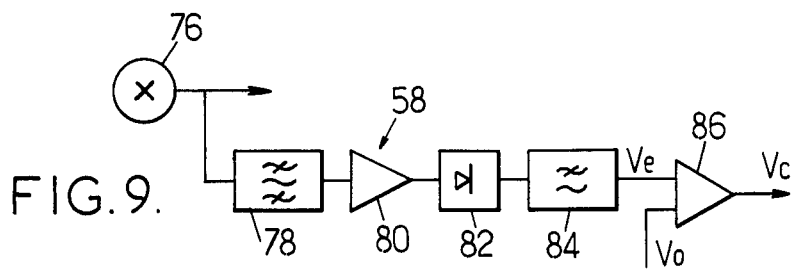
Figure 10:
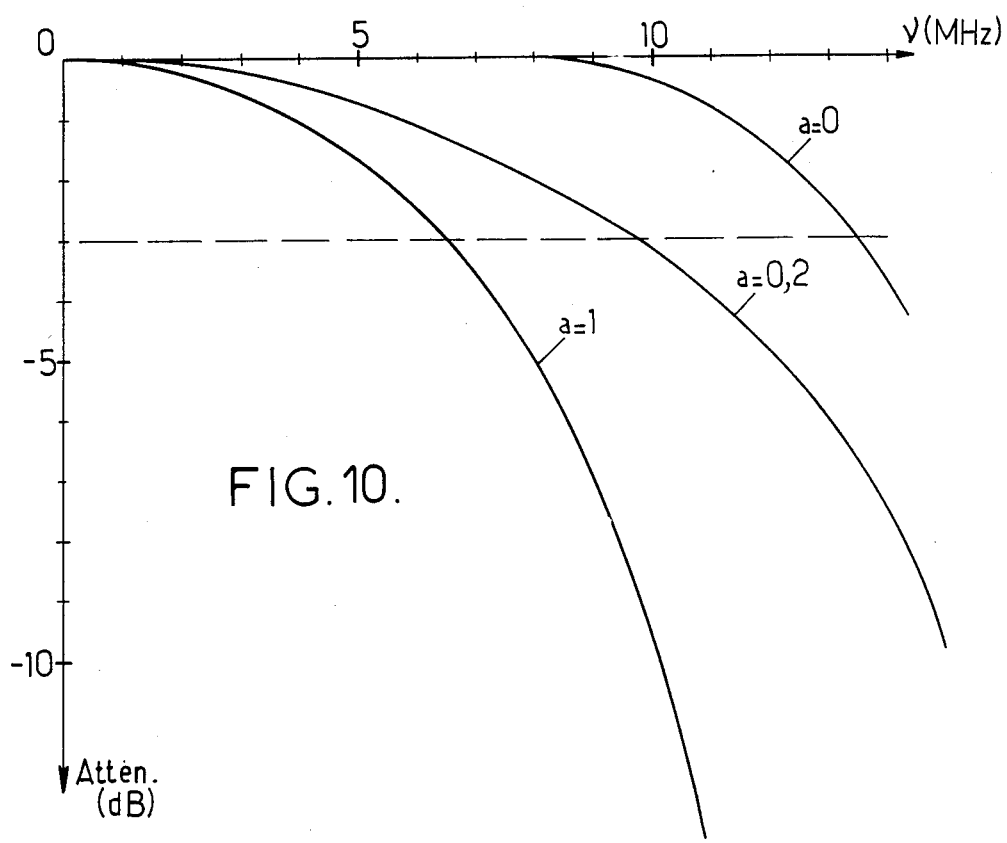

FIG. 5 gives the variation of the error rate on the duobinary coded digital part of the output of the filter, as a function of the carrier-to-noise C/N ratio;

FIG. 6 is a simplified block diagram of the decoding part of an adaptive filter receiver usable for processing a MAC/packet signal with duobinary coding of the data:

FIG. 7 shows a possible construction of the adaptive filter of FIG. 6;

FIG. 8 is a block diagram showing in detail certain elements of that of FIG. 6;

FIG. 8a, similar to a fraction of FIG. 8, shows a modification;

FIG. 8b is a general diagram of an adaptive digital filter, formed by a three coefficient transverse filter, usable for replacing the analog filter of FIG. 8;

FIG. 8c is a diagram of a modification forming a simplification of FIG. 8b;

FIG. 9 shows an analog embodiment of the circuit for controlling the band width of the filter of FIG. 7;

FIG. 10 shows the transfer functions of the adaptive filter of the filter of FIG. 7, for different settings.

Figure 13:
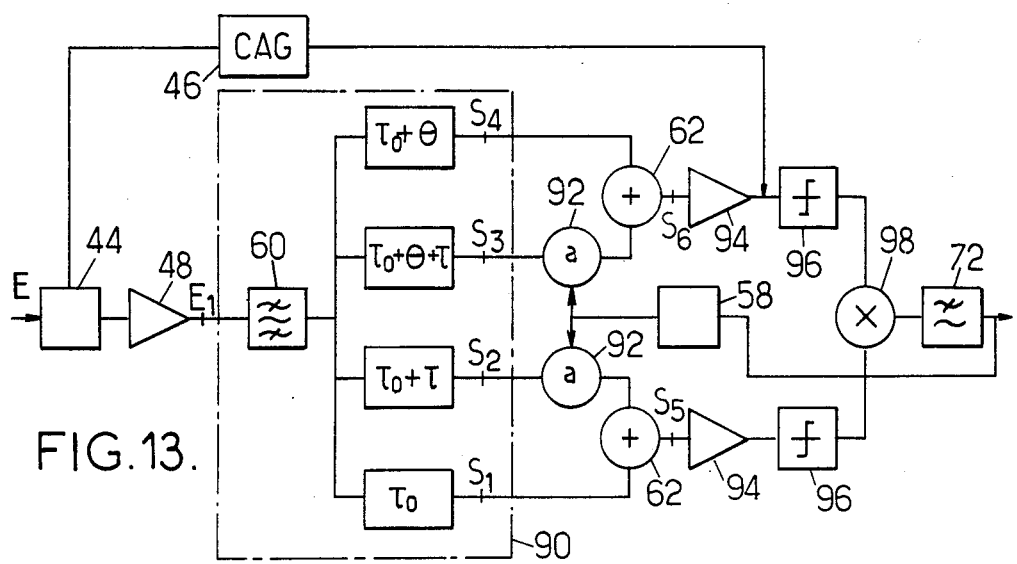
Figure 14:
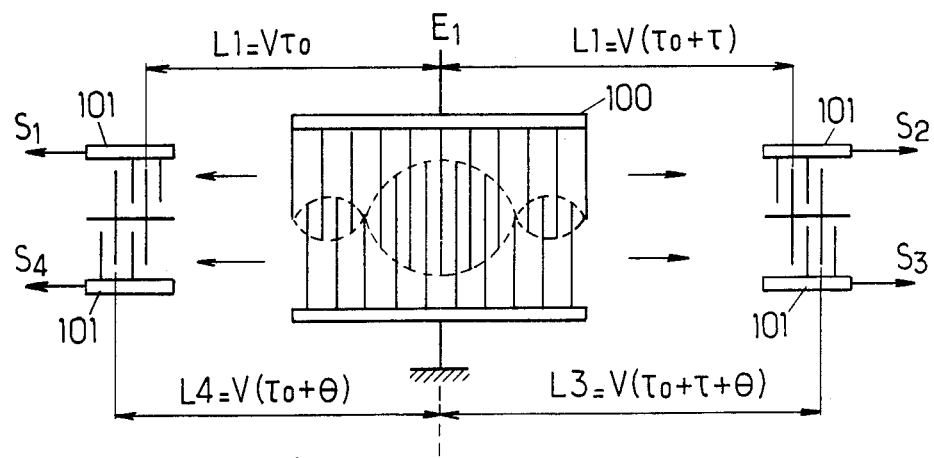

FIG. 11 gives the variation of the error rate on the demodulated bits as a function of C/N, for the filter of FIG. 10;

FIG. 12 shows the variation of the signal-to-noise ratio S/B as a function of C/N for the same filter, FIG. 13 shows a surface acoustic wave unit, combining a filter and a discriminator, FIG. 14 shows a possible construction of the transducers of the filter of FIG. 13; and FIG. 15 is a diagram of adaption to a land receiver.

DESCRIPTION OF PARTICULAR EMBODIMENTS

Figure 1:
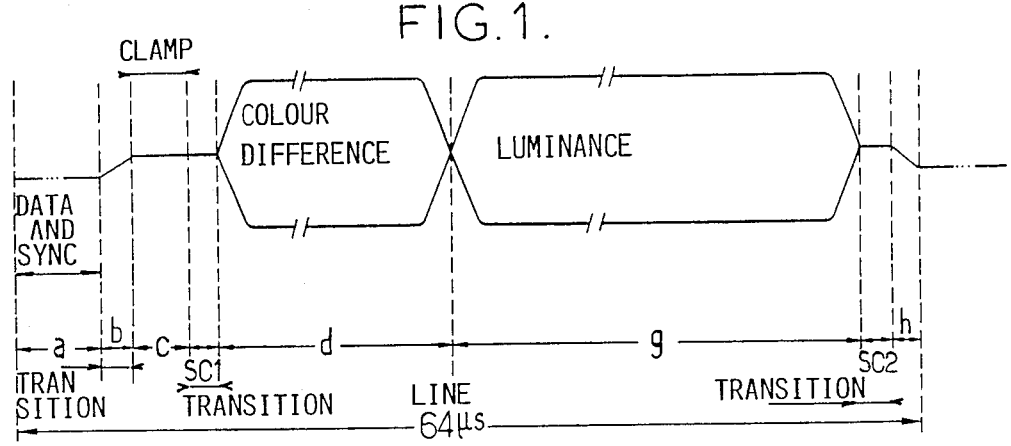
FIG. 1 shows the waveform of a 64 μs television line of a so-called "MAC-packet" signal.

The invention will be described in its application to a television system using a radio frequency TDM signal in which the carrier is frequency modulated, on the one hand, by analog image signals during a fraction of the line duration and, on the other hand, digitally by means of a duobinary coded data signal. The time distribution of a line duration may be that already given in FIG. 1.

But the data burst is then duobinary coded at 10.125 Mbits/s (instead of 20.25 Mbits/s in the case of C-MAC packet).

Figure 2:
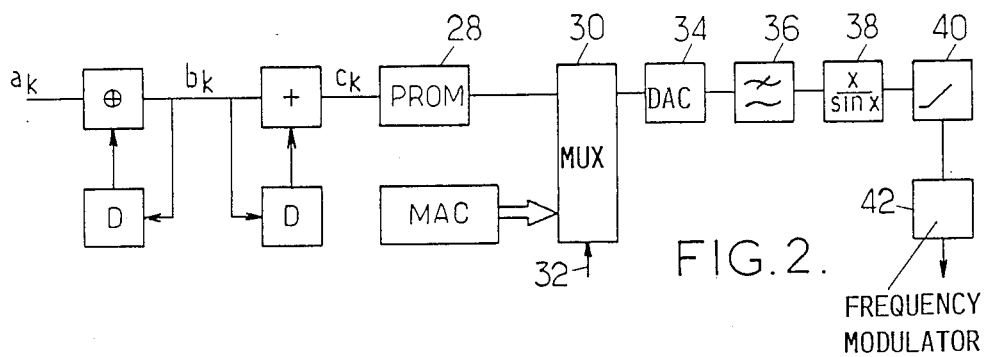
FIG. 2 is a very simplified block diagram of the encoding part of a television transmitter for supplying a signal of the kind shown in FIG. 1, with duobinary coding of the digital part.

The modulating signal may be generated as shown in the diagram of FIG. 2. The data signal (digitally coded sound channel) and other services (particularly synchronization information) undergoes, after mixing by means of a pseudo-random generator, precoding of the form:

$$b_k = a_k \oplus b_{k-1}$$

for avoiding the propagation of errors, then the duobinary coding properly speaking: $c_k = b_k + b_{k-1}$ from which : $c_k (\text{mod } 2) = a_k$.

Figure 3:
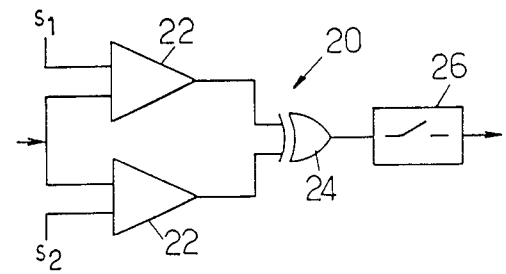
FIG. 3 is a duobinary decoder diagram.

It should be noted in passing that decoding of the duobinary signal into base band (at the output of the high frequency demodulator which will be provided in the receiver) is simply provided by means of a circuit 20 which may be as shown in FIG. 3, comprising two comparators 22 and an "EXCLUSIVE OR" gate 24. The binary signal obtained is then sampled at 26.

The duobinary signal obtained may have three levels which may be selected as corresponding:

level 0, to colour difference or "chrominance" level 0, level 1, to the black and white levels.

The corresponding processing is shown schematically in FIG. 2 by means of a ROM 28.

The data and image signals (these latter coded over 8 bits for example) are juxtaposed by a time multiplexer 30 controlled by a switching input 32. The multiplexed signal is then subjected to:

analog/digital conversion by a converter 34, low pass filtering for eliminating the components beyond the sampling half frequency, by means of a rectangular filter 36 having a band width of 5 MHz, correction as x/sin x at 38, so as to avoid interferences between symbols at the sampling times.

Figure 4:
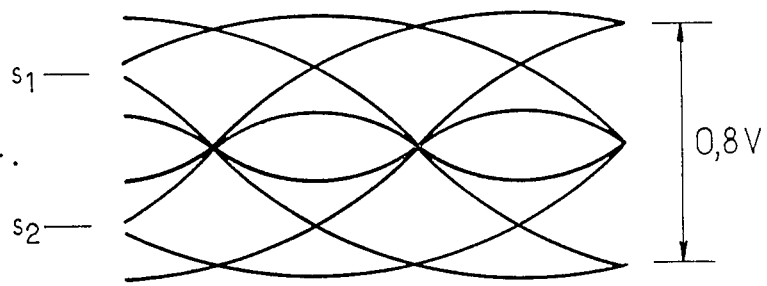
FIG. 4 is the eye diagram of the signal supplied by the transmitter of FIG. 2.

The eye diagramm of the signal obtained is of the kind shown in FIG. 4. The modulation is chosen so that, for 1 volt peak-to-peak corresponding to a black-white transition of the luminance signal, the amplitude of the data is 0.8 V at the times of non-interference between symbols. The decoding thresholds s1 and s2 (FIG. 3) are chosen approximately in the middle of the eye.

The signal obtained is finally subjected, at 40, to preaccentuation (or pre-emphasis) which may be that standardized by EBU, of the form:

$$G(v) = [1 + (v/fb)^2]/[1 + (v/fa)^2]$$

with fa=1.504 MHz and fb=0.842 MHz.

The frequency modulator 42 which follows the preaccentuation cell 40 has a modulation slope of 9.6 MHz/V. Thus, the frequency deviation of the modulated carrier has the following values:

for the image signal, 9.6 MHz, for the low frequency components and 13.5 MHz for the transition frequency of the preaccentuation cell (1.37 MHz), for the data signal, at the times of non-interference between symbols, 7.6 MHz for the low frequency components of the signal and 13.5 MHz for the peak-to-peak values of the signal, which corresponds to a modulation index of 1.35.

On reception, the frequency modulated carrier must be demodulated so as to cover the digital signal and the analog signal, after passing through intermediate frequency and channel filtering. In the case of C-MAC packet designed above, filtering and demodulation must be effected by separate channels for the two signals. In the case, on the contrary, where the spectral space requirement of the two types of signal is comparable, demodulation may be effected by means of the same unit. Calculation and experience show that the quality of the services will depend on the reception filter band width which precedes the demodulator properly speaking. This service quality also depends on the characteristics of the low pass filter which follows the demodulator and which must have different characteristics for the digital part and for the analog part of the signal. In the case where the coding used is duobinary, and with the particulars given above:

the optimum performances of the digital service will be attained with a band pass filter having a band width at −3 dB equal to 14 MHz. These characteristics may be attained with a four pole Butterworth filter or a surface wave filter. FIG. 5 shows the variation of the error rate as a function of the carrier-to-noise ratio C/N in the 27 MHz band, for two filters one of which has a width of 14 MHz and the other a width of 27 MHz; the same optimum performances are obtained with a low frequency low pass filter having a band width at −3 dB equal to 5 MHz, as mentioned above;

for the analog signal MAC, the best results would as a rule be obtained with a band pass reception filter having a width at −3 dB equal to 27 MHz. But, because frequency modulation is used, the results depend on the pulse noise when the carrier-to-noise ratio drops below the threshold (about 10 dB). This noise is manifested by the appearance of black and white dots which degrade the quality of the image. The number of these dots depends on the characteristics of the modulation and on the band width of the reception filter. The subjective gain with respect to—pulsive noise is of the order of 2 dB when passing from a 27 MHz wide filter to a 14 MHz filter.

It can then be seen that by reducing the band width of the common filter below the optimum value (of 27 MHz for the analog signal when the carrier to noise ratio is high) without however going down below the half width, the sensitivity to pulsive noise is appreciably reduced without degrading the sound, at the cost of increased distortion.

As for the low pass filter which follows the frequency demodulator, it allows an optimum quality of the analog image signal to be obtained if it has a pass band of at least 7.5 MHz.

Two solutions are possible in the construction of a single frequency demodulator in accordance with the invention for obtaining substantially optimum performances for the digital signal without causing unacceptable degradation of the analog signal in the presence of pulsive noise exceeding the threshold.

In so far as the common band pass filter which precedes the demodulator is concerned, a rough solution consists in using a filter with a band width less than the optimum one for demodulation of the analog signal in the absence of pulsive noise, but however greater than or equal to the optimum band value for the sound. A filter may possibly be used whose band width is controlled manually.

A more elaborate and more satisfactory solution consists in using an adaptive filter having a variable band width and a circuit for automatically reducing the band width when the C/N ratio drops below a given value, 10 dB for example.

The general construction of the receiver, downstream of the radio frequency parts, may then be as shown in FIG. 6. The input element is formed by an electronic attenuator 44 associated with an automatic gain control circuit 46, allowing a constant carrier level to be obtained at the input of the limiter of the demodulator when this latter is of the conventional type associating a limiter and a discriminator. It is followed by an amplifier 48 for bringing the signal to a suitable value and the adaptive filter 50 which drives the frequency demodulator 52. This latter is followed by a deaccentuation cell 54 and image and data signal processing circuits 56, which will be discussed further on. A circuit 58 controls the width of filter 50 from the error rate found at the output of the frequency demodulator 52.

The band width at −3 dB of the adaptive filter 50 may vary between 2 values W1 and W2 (W2 being less than W1) when the carrier to noise ratio C/N decreases. By taking again the example mentioned above:

$$W = W1 = 27 \text{ MHz for } C/N > \rho1,$$

$$W = f(C/N) \text{ for } \rho2 < C/N < \rho1.$$

The function f should decrease monotonically from W1 to W2 when the C/N ratio decreases between $\rho1$ and $\rho2$. When C/N becomes less than $\rho2$, W keeps the constant value W2.

The adaptive filter 50 may be formed as shown in FIG. 7.

In this figure, the filter 50 comprises a fixed filter 60, of the LC or surface wave (SAW) type followed by an adaptive part. In FIG. 7, the input signal is divided into two channels in the adaptive part. One of the channels is applied directly to one of the inputs of a summator 62. The signal passing through the other channel is delayed by a time $\tau$, for example in a delay line 64, then passes through an electronic attenuator 66 giving an attenuation a between 0 and 1, controlled by the applied voltage VC. The output of the attenuator 66 is applied to the other input of summator 62. The transfer function of the adaptive part is then given by the expression:

$$F(\nu) = 1 + a \cdot \exp(-j2\pi\nu\tau)$$

The modulus $\rho(\nu)$ of this function has for expression:

$$\rho(\nu) = |F(\nu)| = [(1 + a \cos 2\pi\nu\tau)^2 + (a \sin 2\pi\nu\tau)^2]^{\frac{1}{2}}$$

with $0 \leq a \leq 1$.

It can be seen that $\rho(\nu) = 1$ for $a=0$ and that $\rho(\nu) = 2 \cos\pi\nu t$ for $a=1$: in the case where $a=1$, the band width between two zeros of $\rho(\nu)$ is defined by $\Delta\nu = 1/\tau$. The central frequency fO should confirm the relationship $fO = N/\tau$, N being an integer.

In the application considered here by way of example, the following values may be chosen:
fO = 115 MHz
$\Delta\nu$ = 23 MHz
N = 5
$\tau$ = 43.4 ns The complete frequency demodulator may be formed as shown in FIG. 8, in which we find again the electronic attenuator 44 associated with its control circuit 46, the fixed band filter 60, amplifier 48, the adaptive part, a limiter 68, a frequency discriminator 70, the deaccentuation cell 54 whose transfer function is the inverse of the preaccentuation cell of the transmitter, and a low pass filter 72.

The low pass filter 72 has two channels, one associated with the image signal processing circuit 110 and the other with the circuit 112 which processes the digital signal and supplies the synchronization signal at an input 114 of circuit 110. The low pass filters 116 and 118 of the two channels will have a value close to the optimum values mentioned above.

A simpler solution consists in using an adaptive filter with a single channel, having the same general construction as the high frequency adaptive filter 50 of FIG. 8. This filter (FIG. 8A) will then be formed by connecting in series an adaptive filter with delay line and a conventional LC type filter 120. The adaptive part then comprises the delay line 122 and an adjustable attenuator 124 whose attenuation rate is fixed by a control voltage also applied to a variable gain amplifier 126 which follows a summator receiving a direct signal and the delayed signal. The variable gain amplifier 126 allows a constant output voltage to be obtained, whatever the attenuation introduced by the attenuator 124.

Amplifier 126 and attenuator 124 are designed and controlled so that gain G of the amplifier is:
G = GO for a = O
G = GO/2 for a = 1,
a being the attenuation and GO a given gain.

In the application to satellite television, filters 120 and 72 may in particular be used having the following characteristics: Fixed filter 120 having a transfer function $F(\nu)$:
$F(\nu) = 1$ for $0 \leq \nu \leq 7.5$ MHz,
$F(\nu) = \cos[\pi/2 \ (\nu - 7.5)]$ for $7.5 \leq \nu \leq 8.5$ MHz,
$F(\nu) = 0$ for $\nu > 8.5$ MHz.
Adaptive part:
Delay line 122 supplying a delay $\tau = 50$ ns.

The filter assembly thus obtained has a band width at $-3$ dB which varies: 8 MHz for $a=0$ to 5 MHz for $a=1$.

The control voltage Vcc supplied to the adaptive filter 72 must vary as a function of the carrier to noise ratio C/N. This voltage may be elaborated in a similar way to the voltage VC for controlling the attenuator 66, which will be described further on.

In the case illustrated in FIG. 8, the frequency discriminator 70 delivers the product of the input signal multiplied by the same signal delayed by a time $\theta$. In practice, the delay will be provided by means of a delay line 74 which may be formed by a length of coaxial cable. Multiplication of the signals may be provided by a ring modulator 76. When the frequency varies, the output voltage of the multiplier 76 is a periodic function of $\nu$, formed from sinusoid arches. For obtaining a frequency discriminator centered on fO, the delay $\theta$ must satisfy the relationship:

$$\theta = (2P + 1)/4fo$$

where p is a positive integer. The distance between two peaks is then equal to $B = \frac{1}{2}\tau$.

In the application to satellite broadcasting at 12 GHz, $\theta$ may be chosen equal to 15.2 ns (which corresponds to P=3 for a central frequency of 115 MHz and a band width P=32.8 MHz). This device appreciably improves the demodulated signal to noise ratio close to the threshold.

The demodulator of FIG. 8 further comprises the pass band width control circuit 58, whose purpose is to provide a control voltage which varies as a function of the carrier to noise ratio C/N, in the whole of the band of the fixed filter 60. This control circuit may be in analog or digital form.

FIG. 9 shows an analog embodiment of circuit 58. The circuit 58 shows in FIG. 9 comprises a narrow band input filter 78 whose central frequency is greater than that of the useful signal, for example about 9 MHz. The output signal of filter 78 is amplified at 80, and it drives an amplitude detector 82 followed by a low pass filter 84 which delivers a voltage Ve proportional to the spectral density of the demodulated noise in the narrow band of the filter. The voltage Vc is applied to one of the inputs of a differential amplifier 86 whose other input receives a reference voltage Vo. The characteristic of amplifier 86 allows the law of variation of the pass band of the adaptive filter 50 to be fixed as a function of the noise. An amplifier 86 may for example be used such that:
Vc = 0 if Ve ≤ Vo $V_c = G \, V_e$ if $V_e > V_o$ ($G$ being the gain of the amplifier 86).

If the voltage $V_o$ has the value corresponding to a spectral noise density such that C/N=10 dB in a 27 MHz pass band, it can be seen that this device will only deliver a control voltage to a filter if C/N is less than 10 dB.

Numerous digital embodiments are possible. They will not be described, because they are extremely simple to provide. An immediate solution consists in measuring the error rate on the binary elements (or bits) of the digital signal and in deriving a voltage proportional to this error rate, or at least a voltage increasing as a function of the error rate. A circuit for measuring that error rate and delivering such a voltage $V_c$ is indicated in dashed lines at 115 in FIG. 8.

The measurement may for example be made using the 7 bit line synchronization word which precedes each digital burst in a system of the MAC/PACKET type. For that, it is sufficient, in a shift register, to make a bit to bit comparison of the signal received and of the synchronization word stored in the receiver. Another solution consists, since the duo-binary coding involves prohibited transistions, in determining the error rate by the presence and the frequency of such prohibited transitions.

The digital construction may even extend to the adaptive filtering as a whole, by substituting a three coefficient adaptive digital filter for the circuit of FIG. 7.

FIG. 8b shows such a filter, of the finite or transverse pulse response type, having two elements 128 with delay $\tau$ and three attenuators 130 imposing attenuation rates a1, a2 and a3. In particular, a1=a3=a and a2=1 may be adopted. When the coefficient a varies then between 0 and 0.5, the modulus $\rho$ of the transfer function varies between $\rho=1$ for a=0 and $\rho=1+\cos 2\pi \nu t$ for a=0.5. By choosing a central frequency $O=N/\tau$, an amplitude/frequency response is obtained about $\nu O$ which has the form of a boosted cosine the band width between two zeros being equal to $\Delta\nu=1/\tau$.

This type of filter has the advantage of not causing any phase distortion when the coefficient a has any value between 0 and 0.5.

The embodiment shown in FIG. 8b is not the only one possible. FIG. 8c shows a variant comprising a single attenuator 134 and two delay lines 136 and 138, giving respectively delays $\tau$ and $2\tau$.

FIG. 10 gives the transfer function of the adaptive filter of FIG. 8, when this latter comprises a fixed Butterworth type 4 pole filter 60 with band width at −3 dB equal to 27 MHz and a delay line filter with $\Delta\nu/2=14$ MHz, for different values of a. FIG. 11 gives the error rate on the demodulated binary elements of the digital signal obtained with the demodulator of FIG. 8, when the threshold for bringing the adaptive filter into service was fixed at C/N=10 dB for the complete 27 MHz band. It can be seen that, for C/N<10 dB, the performances obtained are very close to those corresponding to optimum filtering (represented by a substantially rectangular four pole Butterworth filter with a pass band of 27 MHz), for which the error rate is shown with a broken line.

The law of passage from a=0 to a=1 shown in FIG. 11 is obviously not the only one possible. For example, a constant error rate could be maintained from a given value, which represents a convenient solution to use in the case of a digital measurement of the error rate. The transition line between the curves corresponding to a=0 and a=1 would then be horizontal. It would also be possible to reduce the width of the filter from a value of C/N differing by 10 dB. Generally, the transition law judged the most appropriate may be adopted between a pass band close to the optimum for the analog part (when the carrier to noise ratio is high) and the optimum pass band for the digital part. FIG. 12 shows, for the same transition law as that of FIG. 11, the luminance weighted signal to noise ratio for the image signal as a function of the carrier to noise ratio C/N in the 27 MHz band. It can be seen that the subjective gain obtained below the threshold is of the order of 2 dB for the maximum narrowing of the pass band.

In the method of obtaining frequency demodulation with adaptive filtering illustrated in FIG. 8, the filtering and discrimination operations are effected by different means. In the variant which will now be described, the whole of the operations required for frequency demodulation with adaptive filtering are provided by surface acoustic wave means which are all carried by the same substrate.

It should be mentioned in this connection that a differential demodulator has already been proposed (French Pat. No. 2312 881) for demodulating waves phase shift modulated by digital bursts, particularly when the phase shift is a two state phase shift. The invention goes very much beyond this prior conception, since it provides a frequency demodulator which allows both demodulation of the digital part and of the analog part of a signal to be provided and at the same time allows adaptive filtering guaranteeing optimum matching of the pass band to the carrier/noise ratio.

The embodiment of the invention of which a diagram is shown in FIG. 13 may be constructed using an implementation process similar to that described in French Pat. No. 2312 881 to which reference may be made, so that it will be sufficient here to give a brief description. In FIG. 13, the parts corresponding to those already described bear the same reference number.

The input E of the device of FIG. 13 receives the moduated carrier which passes through an attenuator 44 and an amplifier 48 similar to the corresponding elements in FIG. 8; The surface acoustic wave part of the device (shown in the broken line frame 90 in the Figure) comprises a filter 16 having a fixed band width at −3 dB. This width W will be equal to 27 MHz in the example considered above. The output signal of filter 60 is divided between four channels in which different delays are interposed, respectively equal to $\tau O$, $\tau O + \tau$, $\tau O + \tau + \theta$ and $\tau O \theta$.

The output signals from these four channels are designated by s1, s2, s3 and s4. Each of the signals s2 and s3 is applied to an electronic attenuator 92 with gain varying between 0 and 1. The signals s2 and s3 attenuated in the same ratio are respectively added to the signals s1 and s4 in adders 62. Signals s5 and s6 obtained at the output of the summators 62 pass through identical chains each comprising an amplifier 94 and an amplitude limiter 96: the signals obtained at the output of the limiters 96 are identical, except for the delay. The demodulated signal is obtained by the product of the signals from the limiters 96, in a circuit 98, then low pass filtering at 72.

The delay $\tau$ fixes, as in the case considered above, the band width at −3 db of the filter, which will vary between W for a=0 and $\Delta\nu/2=1/2\tau$ for a =1. The delay θ for its part fixes the between peak band width B of the frequency discriminator. We have B=½θ.

The delays τ and θ must then confirm the conditions:
τ=N/fO
θ=(2P+1)/4fO,
N and B being whole numbers.

The control of a may be provided by a circuit 58 identical to the one shown in FIG. 9.

The part of the device of FIG. 13 using surface acoustic waves may be constructed in the form shown schematically in FIG. 14. The device comprises a bidirectional input transducer 100 and four similar output transducers 101. The inter digited combs of the electrodes of the input transducers 100 have fingers of variable length so as to obtain the desired frequency response curve. The distances L1, L2, L3, L4 between the input transducer 100 and the transducers 101 providing the outputs S1, S2, S3 and S4 are such that:
L1=VτO
L2=V (τO+τ)
L3=V (τO+τ+θ)
L4=V (τO+θ)
V being the speed of the surface waves.

In the case of FIG. 13 as in that of FIG. 8, the attenuator 92 may be formed by an electronic PIN diode attenuator. The power dividers and summators may be of conventional type: in the case of FIGS. 7 and 8 for example, the same circuit PSC 2-1 from MCL may be used both as power divider and as summator 62.

Among the advantages which may be obtained through duo-binary coding of the data with a flow rate of 10.125 Mbits/s, should be noted the possibility of receiving a thus coded microwave transmission by simply adding an additional module to a conventional television set. In fact, the low sensitivity of duo-binary coding of the data to the amplitude/frequency response at high frequencies allows it to accomodate a limitation of the pass band. This may be reduced to 4 MHz without appreciable degradation of the signal. Thus, as shown in FIG. 15, it is possible to process the modulated signal in the radio frequency stages (high frequency and intermedate frequency) of a conventional television set 102. The video signal obtained is collected at the peritelevision take-off, then decoded and modulated in a module 104 which supplies the sound signals, the dematrixed television signals R, G, B and the line and frame synchronization signals. These signals are fed back to the peritelevision take off 106, which allows less expensive adaptation of existing sets to the reception of MAC/PACKET transmissions.

I claim:

1. In a receiver for a television system using a RF time division multiplex of analog image signals and digital data and sound signals, said digital signals being coded in a form such that the frequency spectral width required by the analog signals is greater than that required by the digital signals,
a frequency demodulator constructed for delivering demodulated signals on an output comprising: a common input filter connected to receive said multiplex and having a band pass width adjustable between a predetermined higher value close to a value which is optimum for the analog signals when the latter have a high signal-to-noise ratio and a predetermined lower value close to a value which is optimum for the digital signals; and means for automatically adjusting said band pass width responsive to the demodulated signals whereby to optimize reception of the analog image signals without deteriorating the digital data and sound signals.

2. Demodulator according to claim 1, wherein the filter comprises a portion with a fixed pass band equal to the optimum value for the analog part cascaded with an adjustable portion comprising a direct channel in parallel with a channel comprising a fixed delay line and an adjustable attenuator, the two channels being connected to two inputs of a summing circuit.

3. Demodulator according to claim 1, wherein the means for adjusting the band width are arranged to measure the spectral density of the noise after demodulation in a narrow frequency band centered on a frequency higher than the frequency of the analog image signals.

4. Demodulator according to claim 1, wherein the common input filter is a three coefficient digital filter.

5. A frequency demodulator according to claim 1, wherein the means for automatically adjusting the band width is arranged to measure the error rate in line synchronization words included in said digital signals and to derive a control voltage from said error rate.

6. A frequency demodulator according to claim 1 for a direct satellite television broadcast system in the 12 GHz channel using a time division multiplex of frequency modulated analog image signals and duobinary coded digital data and sound signals at a bit rate of 10.125 Mbits per second, wherein said higher value and lower value are substantially equal to 27 MHz and 14 MHz, respectively.

7. A frequency demodulator according to claim 1, wherein said means for automatically adjusting said band pass width are arranged for narrowing the band to a value just sufficient for preventing the signal-to-noise ratio from dropping below a predetermined value.

8. In a receiver for receiving television programs with time division multiplexing of analog image signals and digital data signals coded in a form such that the frequency spectral width required by the analog part is greater than that required by the digital part, a frequency demodulator comprising an input filter whose band width is adjustable to a value intermediate between the value which is optimum for the analog signal when the latter has a high signal-to-noise ratio and the value which is optimum for the digital signal, wherein the means for automatically adjusting the band width is arranged to measure the error rate on the bits of the digital signal and to generate a voltage increasing with said error rate for controlling the filter band width.

9. In a receiver for receiving television programs with time division multiplexing of analog image signals and digital signals coded in a form such that the frequency spectral width required by the analog part is greater than that required by the digital part, a frequency demodulator comprising an input filter whose band width is adjusted or adjustable to a value intermediate between the value which is optimum for the analog signal when the latter has a high signal-to-noise ratio and the value which is optimum for the digital signal, an image signal processing channel fed by said demodulator and having a low pass filter and a digital signal processing channel, in parallel with the image processing channel, having a low pass filter of a width different from that of the filter in said image signal processing channel.

10. Receiver for television system with time division multiplexing of analog image signals and bursts of duobinary coded digital data signals, transmitted during the line and frame blanking intervals, grouped together in packets, comprising the sound and synchronization signals, the optimum spectral width required by the analog part being greater than that required by the digital part, comprising a single common frequency demodulator for the analog and digital signals, having an input filter whose band width is adaptive as a function of the signal-to-noise ratio after demodulation to a width less than the optimum width for the analog part when the latter has a high signal-to-noise ratio responsive to the error rate on the bits of the digital signals only.

11. Surface accoustic wave frequency demodulator for demodulating both an analog part and a digital part, with a spectral band narrower than the analog part, of a frequency modulated signal with analog-digital time division multiplexing, comprising, on a same substrate: a fixed filter having a band width corresponding to the spectral space requirement of the analog signal, whose output drives four parallel channels each formed by an input transducer common to all the channels and an output transducer, two of the channels which form a first pair for which the delays are $\tau O + \tau$ and $\tau O$ (where $\tau O$ is a fixed value and $\tau$ a value corresponding to filtering with a narrower band than that of the fixed filter), driving a first summing circuit whereas the other two channels, which form a second pair for which the delays are $\tau O + \theta + \tau$ and $\tau O + \theta$ (where $\theta$ fixes the frequency discrimination band width), drive a second summing circuit, the two summing circuits supplying, through respective limiters, the inputs of a multiplier whose output is subjected to low pass filtering.

12. Demodulator according to claim 11, wherein the channels corresponding to the delay $\tau O + \tau$ and $\tau O + \theta + \tau$ each comprise an attenuator and a circuit controlling the attenuation rate as a function of the signal-to-noise ratio after low pass filtering.

* * * * *